United States Patent
Marshall et al.

(10) Patent No.: US 9,085,057 B2
(45) Date of Patent: Jul. 21, 2015

(54) FIXTURE FOR SECURING A THIN-WALLED COMPONENT

(75) Inventors: Matthew Marshall, Sheffield (GB); Zunmin Geng, Nottingham (GB)

(73) Assignee: ROLLS-ROYCE plc, London (GB)

( * ) Notice: Subject to any disclaimer, the term of this patent is extended or adjusted under 35 U.S.C. 154(b) by 837 days.

(21) Appl. No.: 13/148,597

(22) PCT Filed: Jan. 25, 2010

(86) PCT No.: PCT/EP2010/000406
§ 371 (c)(1),
(2), (4) Date: Feb. 13, 2012

(87) PCT Pub. No.: WO2010/094382
PCT Pub. Date: Aug. 26, 2010

(65) Prior Publication Data
US 2012/0133103 A1   May 31, 2012

(30) Foreign Application Priority Data

Feb. 20, 2009   (GB) .................................. 0902791.3

(51) Int. Cl.
*B23B 31/30*   (2006.01)
*B23B 31/40*   (2006.01)
(Continued)

(52) U.S. Cl.
CPC .............. *B23Q 3/062* (2013.01); *B23B 31/305* (2013.01); *B23B 31/40* (2013.01); *B23Q 3/082* (2013.01);
(Continued)

(58) Field of Classification Search
CPC .. B23B 31/305; B23B 31/40; B23B 2215/64; B23B 2270/027; B25B 5/065; B23Q 3/062; B23Q 11/0032

USPC .......... 279/2.08, 4.03, 4.11, 2.07, 2.09, 2.22; 294/98.1
See application file for complete search history.

(56) References Cited

U.S. PATENT DOCUMENTS 2,621,867 A * 12/1952 Grettve ...................... 242/571.1
4,200,301 A *  4/1980 Ryan .......................... 279/2.07
(Continued)

FOREIGN PATENT DOCUMENTS

GB         2337711 A     12/1999
GB         2447278 A  *   9/2008    ............... B23Q 3/06

OTHER PUBLICATIONS

Notification of Transmittal of the International Search Report and the Written Opinion of the International Searching Authority, mailed Apr. 26, 2010 in Application No. PCT/EP2010/000406.
(Continued)

*Primary Examiner* — Eric A Gates
*Assistant Examiner* — Chwen-Wei Su
(74) *Attorney, Agent, or Firm* — Oliff PLC

(57) ABSTRACT

A fixture for securing a cylindrical or shell thin-walled component includes a support having one or more securing devices for securing the component to the support. The fixture also includes an inflatable pressure element which, in use, is positioned within the secured component and is adapted to press outwardly, when inflated, against a liner inserted between the pressure element and the inner thin wall of the component. The liner has one or more elastic members, which bias it against the outward expansion of the inflated pressure element. The inflated pressure element and the liner damp vibrations in the component during machining of the outer side of the thin wall.

11 Claims, 3 Drawing Sheets

(51) Int. Cl.
*B23Q 3/06* (2006.01)
*B23Q 3/08* (2006.01)
*B23Q 11/00* (2006.01)
*B25B 5/06* (2006.01)

(52) U.S. Cl.
CPC ............ B23Q 11/0032 (2013.01); B25B 5/065 (2013.01); *B23B 2215/64* (2013.01); *B23B 2270/027* (2013.01); *Y10T 279/1029* (2015.01); *Y10T 279/1216* (2015.01); *Y10T 279/1283* (2015.01)

(56) References Cited

U.S. PATENT DOCUMENTS

| | | | | |
|---|---|---|---|---|
| 4,953,877 A | * | 9/1990 | Slachta et al. | 279/2.05 |
| 6,015,154 A | * | 1/2000 | Andre et al. | 279/2.07 |
| 2004/0262855 A1 | * | 12/2004 | Andre, Sr. | 279/2.08 |

OTHER PUBLICATIONS

International Search Report mailed Apr. 26, 2010 in Application No. PCT/EP2010/000406.

* cited by examiner

FIXTURE FOR SECURING A THIN-WALLED COMPONENT

The present invention relates to a fixture for securing a thin-walled component, such as a rocket nose cone or a gas turbine aero-engine casing.

WO 2008/107672 (hereby incorporated by reference) discloses an adaptive fixture for thin-walled components, for the purpose of enabling them to be machined with sufficient supporting rigidity and dynamic stability so as to maintain machining precision and surface finish to an acceptable engineering standard. The fixture has an inflatable elastomeric pressure element and a liner which fits between the pressure element and the component. It is particularly applicable to thin-walled components where secure fixture and vibration avoidance during machining is otherwise difficult to achieve.

The thin-walled component may have minor openings and an uneven internal/external surface without changing its character. Such a component is difficult to hold while it is machined. The thin wall lacks sufficient static rigidity and dynamic stability to withstand the cutting force generated in the machining process. The thin wall can become dynamically unstable and liable to vibrate, causing machining precision problems, mainly from the insufficient supporting rigidity. Surface finish problems can also result from the unstable self-excited vibration (known as "chatter") between the cutting-tool and workpiece.

Examples of components which can benefit from the fixture of WO 2008/107672 are gas turbine aero-engine casings and rocket nose cones. Such components are often made from difficult-to-machine material, such as heat-resistant alloy, and there is also a need to reduce component mass. However, in order to provide interfaces for connection of other components, machining work is usually inevitable.

For machining outer surfaces of thin-walled cylindrical components, the component is clamped at one end to a base of the fixture of WO 2008/107672. The pressure element and liner of the fixture are then positioned inside the component via the opening at the other end of the component, with the liner being located in the component first and the pressure element second. However, a problem can arise that it is difficult to position the pressure element and liner inside the component using this procedure when access to the internal space of the component is restricted. Indeed, positioning using the procedure can be impossible when the component is, for example, dome-shaped rather than cylindrical and the only major opening to the interior of the component is blocked by the fixture base.

Thus, in a first aspect, the present invention provides a fixture for securing a thin-walled component, the fixture including:
  a support having one or more securing devices for securing the component to the support,
  an inflatable pressure element which, in use, is positioned within the secured component and is adapted to press outwardly, when inflated, against a flexible liner,
  the flexible liner being adapted to fit between the pressure element and an inner thin wall of the component,
  characterised in that the liner has one or more elastic members which bias the liner against the outward expansion of the inflated pressure element, the liner and the pressure element acting to damp vibrations in the component during machining of an outer side of the thin wall of the component.

By a "thin-walled component" we mean a component having one or more thin walls. When such a wall is loaded, transverse shear stresses across the wall are generally insignificant relative to stretching and/or bending stresses in the plane of the wall. The thin wall typically lacks sufficient static rigidity to withstand cutting forces generated in machining operations, becoming dynamically unstable and liable to vibrate.

By a "cylindrical component" we mean a hollow tubular structure having a through-opening. Such a cylindrical component may approximate to a true cylinder, or may, for example, be more frustoconical in shape. By a "shell component", we mean a bowl-like structure having a single major opening. Such a shell component may be shaped, for example, like a cone or a dome.

Typically, in use, the liner is fitted to the deflated pressure element and pre-positioned on the support before the component is itself moved onto the support. Thus, advantageously, the liner, having one or more elastic members which bias the liner against the outward expansion of the inflated pressure element, facilitate the location and the removal of the liner and pressure element when access to the internal space of the component is restricted. For example, the one or more elastic members can reduce the diameter of the pressure element when the pressure element is deflated. That is, they can reduce the diameter the deflated pressure element further than its diameter would be in the absence of the liner.

Typically, the inflatable pressure element is an inflatable elastomeric pressure element. Conveniently, the pressure element is inflated pneumatically. However, it may be inflated by any suitable fluid or gel. The fixture may have more than one pressure element.

Preferably, the support has a retaining element which retains the pressure element in position within the secured component. The pressure element may be a tubular pressure element. For example, the retaining element may extend through the central hole of such a tubular pressure element. In use, the retaining element, component and pressure element may then be concentrically arranged with the pressure element between the retaining element and the component. Typically the liner encircles the pressure element. For example, when the pressure element is a tubular pressure element, the liner may be a cylinder that extends around the circumference of the pressure element.

Preferably, the or each elastic member is an elongate member which extends around the liner, eg circumferentially around a cylindrical liner. When the pressure element is a tubular pressure element, the fixture may have two or more elastic elongate members which extend around the liner and are axially spaced along the axis of the tubular pressure element, eg an elongate member may be positioned at either axial end of a cylindrical liner.

Preferably, the liner has slits which assist the liner to collapse with the pressure element when the pressure element is deflated. For example, when the pressure element is a tubular pressure element, the slits may extend in the axial direction of the tubular pressure element.

The component may be a rocket nose cone or a gas turbine aero-engine casing.

The component may have a cavity in which the pressure element and the flexible liner are positioned, and a neck region through which the pressure element and the flexible liner are inserted to arrive in the cavity, the neck region being narrower than the cavity. That is, the fixture can advantageously be used to position the pressure element and the liner in components with restrictive geometries.

Embodiments of the invention will now be described by way of example with reference to the accompanying drawings in which.

Figure 3:
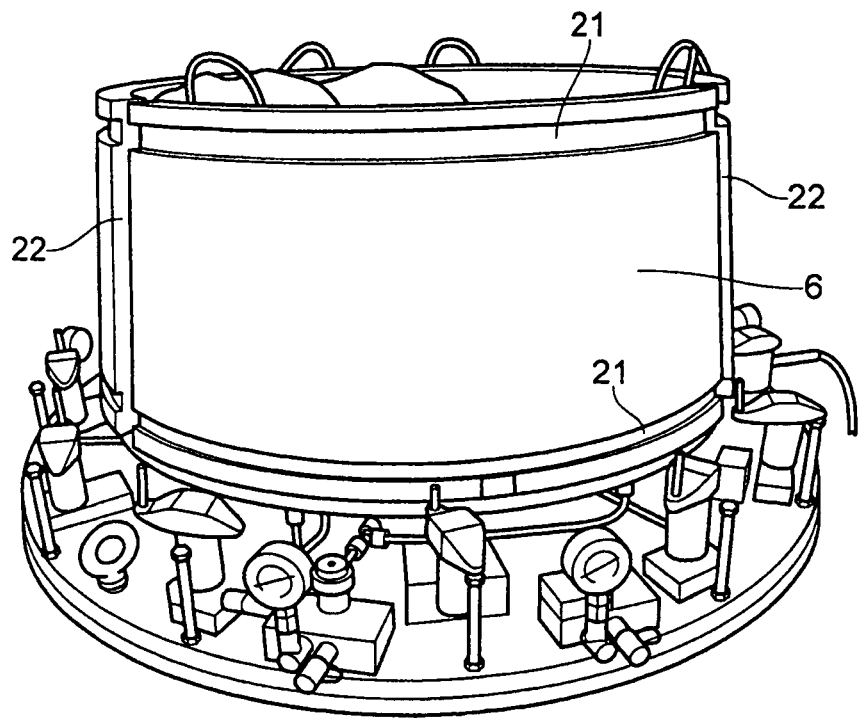
FIG. 3 shows a view of a liner for a fixture such as that shown in FIG. 1.
Figures 4A, 4B:
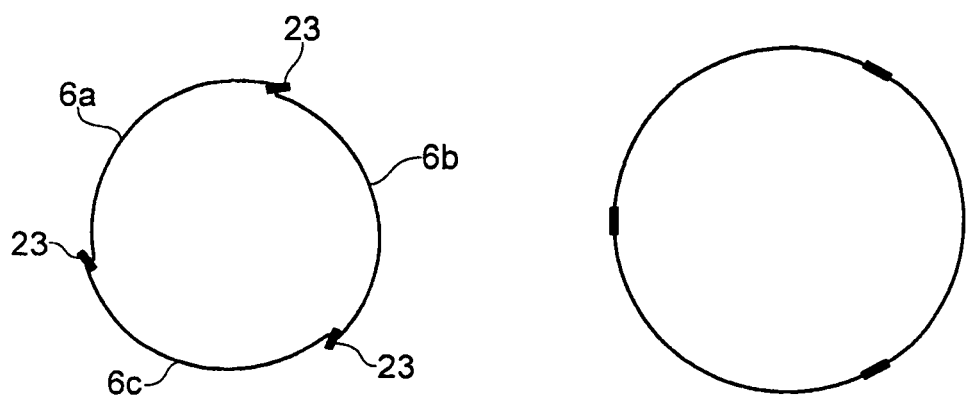

FIGS. 4(a) and (b) are end-on schematic views of the liner of FIG. 3 in respectively its collapsed and expanded states.

Figure 1:
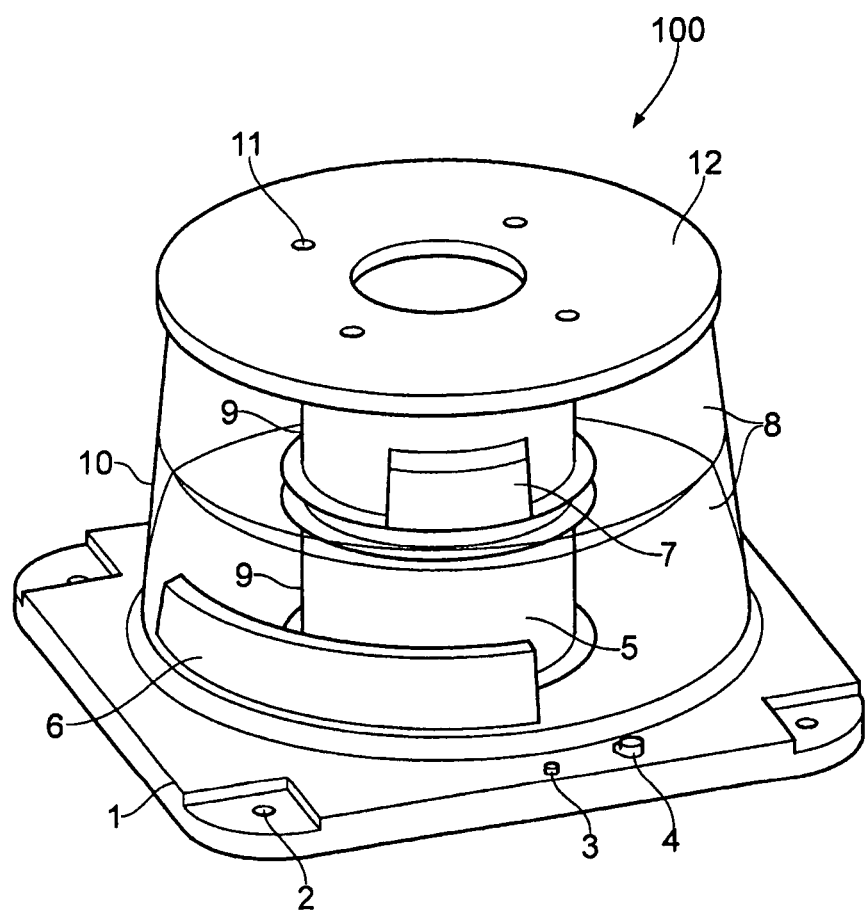
FIG. 1 shows a fixture for the external machining of a thin-walled cylindrical component.

FIG. 1 shows a fixture 100 for the external machining of a thin-walled cylindrical component 10. The fixture comprises a mounting base support 1 in the form of a thick-walled plate having mounting holes 2 for connection to a machine table (not shown) of a machining centre (not shown). Securing devices (pins 3 and clamps 4) locate and clamp the component 10 to the base 1.

A thick-walled rigid arbour or column 5 providing an annular retaining surface is fixed centrally to the base 1 by bolts (not shown). The arbour 5 terminates with a flange to connect to a thick-walled lid 12. Two modified vehicle-wheel inner tubes 8, having an internal radius R corresponding with the radius of the arbour 5, are fitted on the arbour. Being made of elastomeric, resiliently flexible material, the tubes 8 can be inflated to fit the enclosure confined within the cylindrical component 10, support arbour 5, mounting base 1 and lid 12. Each tube 8 has its own air inlet valve 9 on its inner surface, and this is fitted through a respective aperture provided for this purpose on the arbour 5. Each inlet valve 9 is extendable upwardly through the arbour, which is hollow.

A cylindrical flexible liner 6 (only a portion of which is shown in FIG. 1) wraps around the tubes 8 and spreads a uniform supporting pressure to provide dynamic damping normal to the component surface to be machined. Regional enhancements 7 can be incorporated in the liner.

The lid 12 is a thick-walled circular plate provided with a wedged step (not shown) around its circumference to hold the top end of the cylindrical component. Lid 12 is also provided with holes 11 by which it can be attached to the top end of the internal arbour 5 by bolts (not shown).

Conventionally, in order to secure the component 10 to the fixture, the component would first be attached to the base support 1 using the pins 3 and clamps 4. After the component has been securely clamped, the flexible liner 6, followed by the tubes 8 would be dropped into the gap between the central column 5 and the inner wall of the component. Finally, the lid 12 would be attached and the tubes inflated.

Figure 2A:
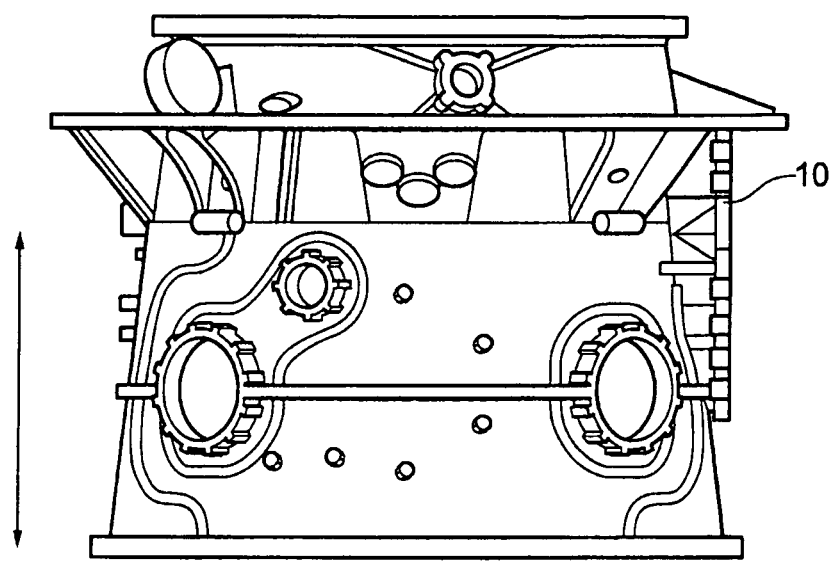
FIG. 2(a) shows a side view of a gas turbine aero-engine casing 10.
Figure 2B:
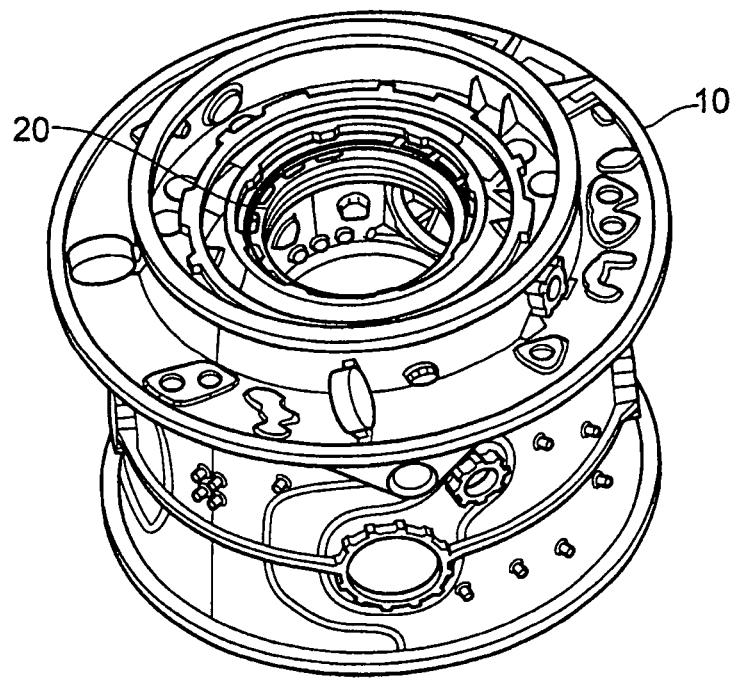
FIG. 2(b) is a perspective view looking towards the narrower end of the casing.

However, this assembly procedure is typically only possible if the component being secured has a relatively unimpeded through-opening. FIG. 2(a) shows a side view of a component which is a gas turbine aero-engine casing 10. The extent of the thin side wall which it is desired to machine and therefore to support with the fixture is indicated by the double-headed arrow. The casing is substantially frustoconical in shape, and for reasons of stability it is desired to clamp the casing with the wider end of the casing downwards. However, as shown by FIG. 2(b), which is a perspective view looking towards the narrower end of the casing, the inner geometry of the casing has a neck region 20 at the narrower end which precludes loading the liner and tubes through the top of the casing.

Therefore, in order to secure the casing shown in FIGS. 2(a) and (b), the fixture has further features which allow vertical loading of the part onto the base support 1, with the liner 6 and tubes 8 already assembled and position on the support. In particular, the liner has elastic straps which bias the liner against the outward expansion of the inflated tubes. The straps also reduce the diameters of the tubes when the tubes are deflated. The liner further has slits which assist the liner to collapse.

FIG. 3 shows a view of the cylindrical liner 6. The elastic straps (not shown) sit in grooves 21 at the axially upper and lower ends of the liner. The straps exert a contracting force on the liner which urges the liner inwards. The contraction is assisted by the three circumferentially spaced slits 22 (only two of which are shown in FIG. 3) which extend in the axial direction and divide the liner into three portions. On deflation, the slits allow the three liner portions to slide over each other. Thus together the straps and the slits enable the liner and tubes to contract to a diameter less than that of the inner wall of the casing into which they are to be inserted, and less than the deflated tubes would otherwise have in the absence of the liner.

The liner may also have spacing elements, such as ties extending across the slits, which ensure that on inflation the liner portions adopt an appropriate circumferential spacing. FIGS. 4(a) and (b) are end-on schematic views of the liner of FIG. 3 in respectively its collapsed and expanded states and show spacing ties 23 connecting the liner portions 6a-c.

To secure the casing 10 to the fixture, firstly, the tubes and liner are attached to the column 5. Indeed, the tubes and liner may be permanently attached to the column. The tubes are deflated so that the tubes and liner shrink to a diameter smaller than that of the bore of the casing. The casing is vertically loaded onto the fixture, dropping over the tubes, liner and column. The casing is restrained by clamping onto the base plate and the tubes can then be inflated. The force generated by inflating is greater than the resistance of the elastic straps so that the tubes and liner expand and the liner presses against the inner surface of the casing.

To remove the casing from the fixture after machining, the securing procedure can simply be reversed.

In this way, the fixture can be used in conjunction with cylindrical components which have narrow through-openings, or with shell components which no through-opening at all.

Although the present invention has been described in FIGS. 1 to 4 in relation to a component such as an aero-engine casing, it is applicable to the machining of many other thin walled components.

The invention claimed is:

1. A fixture for securing a thin-walled component, the fixture including:
    a support having one or more securing devices for securing the component to the support, and
    an inflatable pressure element which, in use, is positioned within the secured component and is adapted to press outwardly, when inflated, against a flexible liner, the flexible liner being adapted to fit between the pressure element and an inner thin wall of the component,
    wherein the fixture has one or more elastic members that comprise an elastomeric material and which bias the liner against the outward expansion of the inflated pressure element and the inflated pressure element and the liner damp vibrations in the component during machining of an outer side of the thin wall, and
    wherein the liner has slits between portions which assist the liner to collapse with the pressure element when the pressure element is deflated.

2. A fixture according to claim 1, wherein the one or more elastic members reduce the diameter of the pressure element when the pressure element is deflated.

3. A fixture according to claim 1, wherein each elastic member is an elongate member which extends around the liner.

4. A fixture according to claim 1, wherein the pressure element is a tubular pressure element.

5. A fixture according to claim 4, wherein two or more elongate members extend around the liner and are axially spaced along the axis of the tubular pressure element.

6. A fixture according to claim 1, wherein the slits extend in the axial direction of the pressure element.

7. A fixture according to claim 6, wherein, when the liner is in a collapsed configuration, the portions partially overlap adjacent portions.

8. A fixture according to claim 7, wherein the portions partially overlap adjacent portions in a radial direction.

9. A fixture according to claim 1, wherein the portions are connected by spacing ties.

10. A fixture according to claim 1, wherein the component is a rocket nose cone or a gas turbine aero-engine casing.

11. A fixture for securing a thin-walled component, the fixture including:

a support having one or more securing devices for securing the component to the support, and an inflatable pressure element which, in use, is positioned within the secured component and is adapted to press outwardly, when inflated, against a flexible liner, the flexible liner being adapted to fit between the pressure element and an inner thin wall of the component, wherein the fixture has one or more elastomeric members which bias the liner against the outward expansion of the inflated pressure element and the inflated pressure element and the liner damp vibrations in the component during machining of an outer side of the thin wall, wherein the liner has slits between portions which assist the liner to collapse with the pressure element when the pressure element is deflated, and wherein, when the liner is in a collapsed configuration, the portions partially overlap one over top of another in adjacent portions in a radial direction.

\* \* \* \* \*